United States Patent
Glazier et al.

(10) Patent No.: US 12,548,809 B2
(45) Date of Patent: Feb. 10, 2026

(54) LONG CYCLE LIFE LITHIUM METAL AND ANODE-FREE CELLS

(71) Applicant: Our Next Energy, Inc., Novi, MI (US)

(72) Inventors: Stephen Glazier, Halifax (CA); Larry Beck, Ann Arbor, MI (US); Steven Kaye, Oakland, CA (US); Mujeeb Ijaz, West Bloomfield, MI (US); Hezhen Xie, West Bloomfield, MI (US); Yadong Huang, Halifax (CA)

(73) Assignee: Our Next Energy, Inc., Novi, MI (US)

( * ) Notice: Subject to any disclaimer, the term of this patent is extended or adjusted under 35 U.S.C. 154(b) by 676 days.

(21) Appl. No.: 17/958,280

(22) Filed: Sep. 30, 2022

(65) Prior Publication Data

US 2023/0106403 A1    Apr. 6, 2023

Related U.S. Application Data

(60) Provisional application No. 63/262,022, filed on Oct. 1, 2021.

(51) Int. Cl.
| | |
|---|---|
| *H01M 10/44* | (2006.01) |
| *H01M 4/525* | (2010.01) |
| *H01M 4/58* | (2010.01) |

(52) U.S. Cl.
CPC ........... *H01M 10/44* (2013.01); *H01M 4/525* (2013.01); *H01M 4/58* (2013.01); *H01M 2220/20* (2013.01)

(58) Field of Classification Search
CPC ........ H01M 10/44; H01M 4/525; H01M 4/58; H01M 2220/20; Y02E 60/10; B60L 58/13;

(Continued)

(56) References Cited

U.S. PATENT DOCUMENTS

| 8,120,290 B2 * | 2/2012 | King ..................... B60L 7/16 |
| | | 180/65.21 |
| 9,000,712 B2 * | 4/2015 | Abe ................. H02J 7/007194 |
| | | 320/101 |

(Continued)

OTHER PUBLICATIONS

A. Khaligh and Z. Li, "Battery, Ultracapacitor, Fuel Cell, and Hybrid Energy Storage Systems for Electric, Hybrid Electric, Fuel Cell, and Plug-In Hybrid Electric Vehicles: State of the Art," in IEEE Transactions on Vehicular Technology, vol. 59, No. 6, pp. 2806-2814, Jul. 2010 (Year: 2010).*

(Continued)

*Primary Examiner* — M Baye Diao
(74) *Attorney, Agent, or Firm* — Butzel Long

(57) ABSTRACT

Methods and systems for providing controlling in a repeatable manner a plurality of anode-free or lithium metal cells in a power-supply system. The cells are connected in series in one or more high energy density hybrid modules connected in parallel. Each high energy density hybrid module includes a corresponding hybrid module controller (HMC) and has a corresponding bi-directional DC-DC-converter, and each cell of the plurality of cells is independently measurable by the HMC. The corresponding bi-directional DC-DC-converter is used to charge and discharge of the plurality of cells in a repeatable manner to be within a selected state of charge (SOC) range that corresponds to a defined cycle life and energy density requirement.

21 Claims, 12 Drawing Sheets

(58) Field of Classification Search
CPC .......... B60L 58/14; B60L 58/15; B60L 58/16; B60L 58/21; B60L 50/64
USPC .......................................................... 320/130
See application file for complete search history.

(56) References Cited

U.S. PATENT DOCUMENTS

| | | | | |
|---|---|---|---|---|
| 9,764,655 | B2* | 9/2017 | Wu .................... | B60L 58/21 |
| 9,849,793 | B2* | 12/2017 | Tashiro ................ | B60L 58/25 |
| 9,913,393 | B2* | 3/2018 | Choi .................. | H05K 7/14325 |
| 9,960,458 | B2* | 5/2018 | Weicker ............. | H02J 7/34 |
| 10,128,528 | B2* | 11/2018 | Zhang ................ | H01M 10/06 |
| 10,158,152 | B2* | 12/2018 | Watson .............. | B60L 3/04 |
| 10,793,019 | B2* | 10/2020 | Duan ................. | H02J 7/0016 |
| 10,811,710 | B2* | 10/2020 | Nada ................. | H01M 8/04731 |
| 10,814,743 | B2* | 10/2020 | Li ..................... | H01M 10/441 |
| 10,876,510 | B2* | 12/2020 | Ciaccio .............. | H01M 10/44 |
| 11,285,842 | B2* | 3/2022 | Hasegawa .......... | B60L 15/2009 |
| 11,658,279 | B2* | 5/2023 | Shterenberg ....... | H01M 4/1395 |
| | | | | 429/231.95 |
| 2008/0020278 | A1* | 1/2008 | Schmidt ............. | H01M 4/485 |
| | | | | 429/231.95 |
| 2013/0022843 | A1* | 1/2013 | Tohda ................ | H01M 10/482 |
| | | | | 429/50 |
| 2013/0316210 | A1* | 11/2013 | Morita ............... | H01M 10/052 |
| | | | | 429/211 |
| 2015/0188188 | A1 | 7/2015 | Zhang | |
| 2016/0023571 | A1* | 1/2016 | Wu .................... | B60L 53/20 |
| | | | | 320/112 |
| 2016/0054785 | A1* | 2/2016 | Choi .................. | B60L 1/00 |
| | | | | 713/323 |
| 2016/0197382 | A1* | 7/2016 | Sood .................. | B60L 58/21 |
| | | | | 73/620 |
| 2019/0225092 | A1* | 7/2019 | Li ..................... | B60L 58/18 |
| 2020/0055405 | A1 | 2/2020 | Duan | |
| 2020/0130511 | A1 | 4/2020 | Botts | |
| 2020/0411901 | A1* | 12/2020 | Dong ................. | H01M 4/133 |
| 2022/0336871 | A1* | 10/2022 | Zhao ................. | H01M 4/386 |

OTHER PUBLICATIONS

International Search Report and Written Opinion issued in App. No. PCT/US2022/045469, mailing date Jan. 31, 2023, 15 pages.

* cited by examiner

LONG CYCLE LIFE LITHIUM METAL AND ANODE-FREE CELLS

FIELD

The disclosure relates generally to lithium metal and anode-free cells and more specifically, to systems, methods and computer programs for operating lithium metal and anode-free cells in a repeatable manner to achieve cycle life and energy density requirement.

BACKGROUND

Energy storage devices with high energy densities are sought after to supply power to electric vehicles (EVs) and other electronic devices. Lithium-ion batteries have been one of the most broadly utilized energy storage devices for EVs. A typical lithium-ion battery includes several cell stacks, each made of an anode (i.e., graphite), a separator, a cathode, and an electrolyte. The electrolyte includes salts, solvents and additives.

The salts are the passage for lithium ions to move, the solvents are organic liquids used to dissolve the salts, and the additives are added in small amounts for specific purposes.

During charging, lithium ions extracted from the cathode materials, diffuse through the electrolyte-soaked separator, and then intercalate into the graphite material. The interaction is reversed during a discharge cycle. In these batteries, the usable energy is controlled by the type and amount of active materials present, though a total weight, cost, volume and manufacturing time are dictated by all components, with sizable contributions coming from inactive components such as the separator, current collectors, and building materials.

An alternative to lithium-ion batteries which holds more energy in the same volume are lithium metal batteries. However, these batteries are known to be highly unstable, preventing them from being widely adapted in practical/commercial applications.

BRIEF SUMMARY

The illustrative embodiments disclose a method and system for operating a lithium metal or anode-free cell. In one aspect, the method includes providing a repeatable operation of a plurality of anode-free or lithium metal cells in a power-supply system by connecting the plurality of cells in series in one or more high energy density hybrid modules connected in parallel. Each high energy density hybrid module may include a corresponding hybrid module controller (HMC), and each cell of the plurality of a cells may be independently measurable by the HMC. The method may provide each high energy density hybrid module with a corresponding bi-directional DC-DC-converter, and control, in a repeatable manner, using the corresponding bi-directional DC-DC-converter, a charging and discharging of the plurality of cells to be within a selected state of charge (SOC) range corresponding to a defined cycle life without compromising energy density.

The method may also include obtaining for the control process, an operating voltage range of the plurality of cells, that corresponds to the selected SOC range and includes an upper cutoff voltage and a lower cutoff voltage.

In another aspect, a battery is disclosed. The battery may comprise a plurality of anode-free cells or lithium metal cells connected in series in one or more high energy density hybrid modules connected in parallel, each high energy density hybrid module including a corresponding hybrid module controller (HMC), and each cell of the plurality of cells being independently measurable by the HMC. The battery may also include a corresponding bi-directional DC-DC-converter for each high energy density hybrid module which are operated to control, in a repeatable manner a charging and discharging of the plurality of cells to be within a selected state of charge (SOC) range corresponding to a defined cycle without compromising energy density.

The battery may also include includes a balancing device for each cell, connected in parallel with the cell and which may be operated to selectively discharge an electric charge stored in the cell. The cells of the battery may have a stacked electrode configuration or a wound electrode configuration.

In another aspect, a vehicle is disclosed. The vehicle may include a range-extender battery which is made of a plurality of lithium metal or anode-free cells connected in series in one or more high energy density hybrid modules connected in parallel, each high energy density hybrid module including a corresponding hybrid module controller (HMC), and each cell of the plurality of cells being independently measurable by the HMC. A corresponding bi-directional DC-DC-converter for each high energy density hybrid module may be operated to control, in a repeatable manner, a charging and discharging of the plurality of anode free battery cells to be within a selected state of charge (SOC) range corresponding to a defined cycle life and energy density requirement.

The vehicle may also include further includes a processor and a memory storing instructions that, when executed by the processor, configure the vehicle to obtain an operating voltage range of the plurality of cells, corresponding to the selected SOC range. The operating voltage range may include an upper cutoff voltage and a lower cutoff voltage limit for repeatably controlling the charging and discharging of at least one cell of the plurality of cells to be within the selected SOC range. This may be achieved by measuring a voltage of the at least one cell using the corresponding HMC. Responsive to determining that said lower cutoff voltage is reached, a discharge of said at least one cell is stopped and responsive to determining that said upper cutoff voltage is reached, a charging of said at least one cell is stopped.

The vehicle may also include a traction battery that is designed to be connected to and disconnected from a high-voltage DC bus of the vehicle to power one or more loads of the vehicle. A current density of the plurality of cells is controlled during use of the vehicle independently of a power requirement of the one or more loads of the traction battery. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced. Certain novel features believed characteristic of the power supply system are set forth in the appended claims. The power supply system itself, however, as well as a preferred mode of use, further non-limiting objectives and advantages thereof, will best be understood by reference to the following detailed description of the illustrative embodiments when read in conjunction with the accompanying drawings, wherein:

DETAILED DESCRIPTION

Figure 1A:
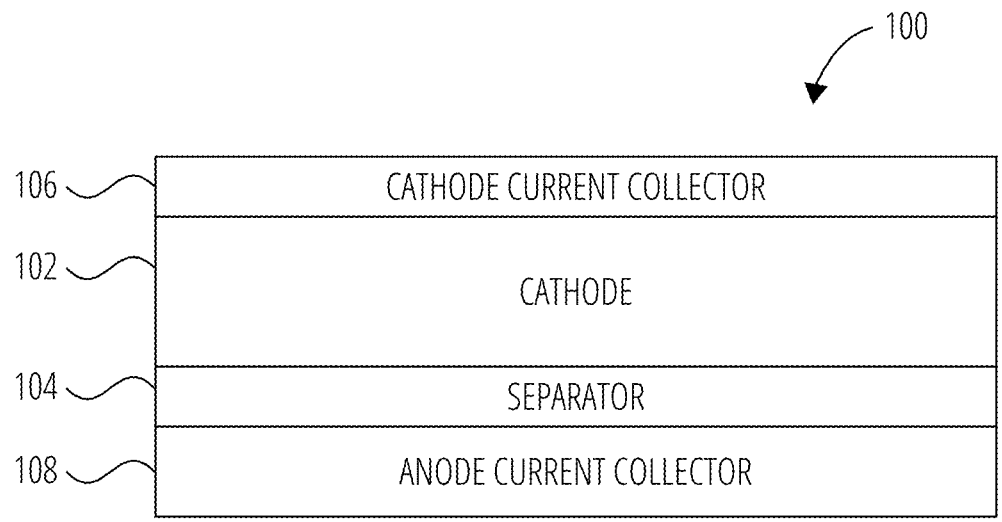
FIG. 1A depicts an anode-free cell in accordance with one or more embodiments.

Anode-free, anode-less or initial anode-free cells, are a type of lithium metal cells. Lithium-metal cells may work in a similar fashion to lithium ion cells but instead of using a graphite anode host material, may use a high-energy lithium metal. Anode-free lithium (Li) metal cells are lithium metal cells that may be manufactured without a lithium metal anode, or any other anode host material, such as graphite, titanate, iron-oxide, silicon, silicon-oxide. In some embodiments discussed herein, the anode-free cells may be cells wherein a lithium anode is subsequently generated, after manufacturing, in operando inside the cell during operation as the cell changes under an external influence when the cell is charged the first time. However, in other embodiments discussed herein, anode-free cells may be cells that have a ratio of anode capacity to cathode capacity being less than 1 when the cell in a fully charged state. In other words, all lithium may be removed from the cathode when the cell is fully charged. Lithium ions, provided by the cathode active material, are deposited as metallic lithium onto a metal substrate, such as copper or nickel foil or mesh to create the working cell. Though anode-free, anode-less or initial anode-free cells are discussed herein, these are not meant to be limiting as the methods and systems may also equally apply to lithium metal cells in general. Lithium metal and anode-free lithium cells may have certain advantages over traditional lithium ion, as they are more energy dense. Anode-free cells may also be less expensive and easier to assemble due to their lack of anode coating and ability to utilize Li-metal's full capacity. The illustrative embodiments are thus directed to anode-free cells and lithium metal in general. The illustrative embodiments, however, recognize that there may be significant obstacles in the commercialization of lithium metal and anode-free cells including a growth of Lithium dendrites during repeated charge/discharge processes, and a low Coulombic efficiency (CE) of these processes. These barriers may consequently lead to a safety hazard due to potential internal short circuits and the high surface area of the active material which result in high reactivity, as well as a short cycle life of such batteries emanating from the low CE of lithium cycling. The illustrative embodiments further recognize that even the most promising attempts to commercialize lithium metal and anode-free cells may largely fail due to an inability to control gas generation, and thus the swelling of the cells, during cell usage, due to the decomposition of electrolytes caused by overcharging and overheating.

Given that lithium metal and anode-free cells may possess high capacities, said chemistries when managed properly, may achieve high practical/commercial cycle-life and/or energy density requirements and may be utilized to significantly extend the range of electric vehicles outside conventional capabilities, without the associated safety and CE barriers.

Conventional management of cells may involve the cells being connected in parallel, precluding an ability to precisely control input and output currents passing through the cells. The illustrative embodiments recognize that when individual cells of said rechargeable batteries fail, it is difficult to maintain an integrity and performance of the battery, as the death of the cell is accelerated due to a failure to detect and/or mitigate said failure in time.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of systems are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for power supply systems for electric vehicles using a variety of components that can be purposed or repurposed to provide a described operation, and such adaptations are contemplated within the scope of the illustrative embodiments.

The illustrative embodiments are described with respect to certain types of steps, applications, processors, problems, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

In one or more embodiments, an anode-free cell may be disclosed. The anode-free cell may include a cathode current collector 106, a cathode 102, a separator 104, and an anode current collector 108. In the anode-free cell, a metallic lithium layer 110 is generated in operando during a first charging cycle of the cell. The layer of metallic lithium formed from lithium ions moving from the cathode 102 is deposited on the anode current collector 108. The thicker the lithium layer 110, the higher the cell energy density. However, too thick of a layer a may lead to lower energy density than desired and an undesirable volume change during cycling, which can cause mechanical stresses that contribute to early cell failure. An optimum amount of Lithium may have to be left to improve plating efficiency of the cell and meet practical energy density and cycle life requirements. The present method and system have been found to surprisingly provide high cycle life and range than is available in conventional lithium metal and anode-free systems. Specifically, in one or more embodiments, by not fully depleting an anode-free or lithium metal cell's stored energy (e.g., by leaving, for example, 30% of energy in reserve) the anode-free or lithium metal cell may be used in a hybrid battery pack to deliver a comparatively higher total energy or more miles of range in an EV than that of a conventional battery pack comprising a conventional battery chemistry that is not anode free. Thus, an optimum thickness of a "permanent" layer of lithium, left over by careful depletion of the first layer of lithium formed during the first charging cycle, may provide surprisingly good cell parameters that make the practical use of anode-free cells possible.

One or more embodiments may further provide an ability to consistently and reliably control the current density of the anode-free or lithium metal cells independent of a traction battery's load defined by the vehicle/driver. For example, there may be a need for a constant high discharge rate (e.g. greater than D/5, or greater than D/2), which constant high discharge rate may not be achievable with conventional range extenders. Further, if the anode-free or lithium metal cell is discharged more slowly than it is charged (C rate is lower than D rate) the lithium anode layer may become more porous and may create conditions that favor lithium dendrites, which are a significant safety risk. To achieve as long a cycle life as real-world applications may need batteries to achieve, said batteries may have to be operated under strict conditions to prevent battery degradation. The embodiments recognize that achieving this is extremely difficult task. By providing a battery pack architecture where a draw on the load is not coming from the range extender, the range extender may be charged and discharged according to said strict conditions using the architecture. In other words, a range-extender battery comprising anode-free or lithium metal cells may feed a traction battery at a specified rate consistently and reliably without exceeding threshold anode-free or lithium metal cell operating parameters that are configured to provide a defined cycle life and energy density requirement. By not causing the anode-free or lithium metal cell to fully discharge, a buffer/fuel reservoir may be provided which is desirable and even critical for the performance of a battery with anode-free/lithium metal technology.

One or more other embodiments provide batteries with anode-free or lithium metal cells in which gassing is significantly reduced. The embodiments may also provide a battery with an energy density ranging from 500-1500 Wh/L, a cycle life ranging from 50-10000 cycles, a uniaxial pressure ranging from 0-500 psi, charge and discharge rates ranging from 0.01C-1C and 0.01-10D respectively, and operating temperatures ranging from (−40)° C.-(+100)° C. Desirably, a battery having an energy density of about 1200 Wh/L, Cycle Life (to 80%) of about 200, uniaxial pressure on cells of less than 50 psi (or less than 30 psi or between 10-30 psi), a rate of 0.1C, 0.3D and an operating temperature of 10-40° C. may also be provided. Further, a battery having an energy density of 35 an energy density of about 1200 Wh/L, a Cycle Life (to 80%) of about 350, the uniaxial pressure on cells of about 30 psi, the charge and discharge rates of about 0.2C, 0.5D respectively and the operating temperature of 10-40° C. may be provided. An electrolyte used in the cells may comprise lithium difluoro(oxalato) borate, lithium tetrafluoroborate and a solvent component. The solvent may include fluoroethylene carbonate and diethyl carbonate (about 30:70 vol ratio). Other solvents may comprise: ethylene carbonate, propylene carbonate, ethyl methyl carbonate, dimethyl carbonate. Other lithium salts may comprise: lithium bisoxalate borate, lithium hexafluorophate, lithium tetrafluoro(oxalate)phosphate, lithium bisoxalato difluorophosphate, lithium bis(trifluoromethanesulfonyl)imide, lithium bis(fluorosylfonyl)imide. However, these are not meant to be limiting and other electrolytes may be used.

As used herein, the "cycle life" of a battery refers to the number of times the battery may be cycled between two selected states of charge or between an operating voltage range.

Embodiments described herein are further directed to a power supply system 200 for electric vehicles. The power supply system 200 (FIG. 2) may be configured to include high energy density anode-free or lithium metal cell chemistries in a hybrid architecture to enable the benefits of such chemistries, including significant increases in range, and significant increases in cycle life (provided, for example, by operating the cells under strict operating conditions/parameters) while protecting said architecture from the liabilities of said chemistries that have prevented them from otherwise being relied upon in the automotive field. The power supply system 200 may have a traction battery 202 (including, for example, lithium iron phosphate (LFP)) and a hybrid range extender battery 222 comprising a one or more high energy density hybrid modules 212 that possess one or more anode-free or lithium metal cell chemistries and that can be controlled to provide power to charge the traction battery 202 and/or power the electric vehicle. One or more embodiments recognize that an existing problem in rechargeable battery manufacturing is a need to provide electric vehicles with batteries having high energy densities that increase the range of electric vehicles' available long distance driving beyond conventional ranges while accounting for corresponding low cycle life typically introduced by said high energy densities.

One or more embodiments includes one or more processors 206 (or processors 218, or computer processors 1206, FIG. 12) included in or outside an on-board or external computer system 224 (or computer system 1200, FIG. 12) to monitor and manage the electrical power discharging and charging processes of a battery of the power supply system 200. The term electric vehicle or vehicle as used herein may collectively refer to electrified/electric vehicles, including, but not limited to, battery electric vehicles (BEV's), plug-in hybrid electric vehicles (PHEV), motor vehicles, railed vehicles, watercraft, and aircraft configured to utilize rechargeable electric batteries as their main source of energy to power their drive systems propulsion or that possess an all-electric drivetrain.

Further, as used herein, a sensor is a sensor device that can be a system, an apparatus, software, hardware, a set of executable instructions, an interface, a software application, a transducer and/or various combinations of the aforementioned that include one or more sensors utilized to indicate, respond to, detect and/or measure a physical property and generate data concerning the physical property.

Further, battery energy density is used generally to refer to a measure of how much energy a cell contains in proportion to its volume.

Even further, as used herein, a high energy density module generally refers to a module having cells with a cell energy density ranging from 500 Wh/L to 1500 Wh/L, for example 1000 Wh/L or 1100 Wh/L or 1200 Wh/L. Persons of ordinary skill in the art will recognize, that conventional battery chemistries with automotive levels of performance have cell energy densities, measured at a cell level, below or significantly below 1000 Wh/L, for example, between about 350 Wh/L and 650 Wh/L. Using high energy density chemistries in the hybrid range extender battery 222 ensures the provision of energies, for example, more than twice or three times the energies provided by the traction battery 202.

In one or more embodiments, the power supply system 200 may comprise a traction battery 202 having one or more traction modules 220, a hybrid range extender battery 222 comprising one or more high energy density hybrid modules 212, and a partition between the traction battery 202 and the hybrid range extender battery 222.

Each module may be a battery stack. Those having skill in the art appreciate that other types of battery devices can be used to provide power in the embodiments described herein and, thus, the recitation of a certain configurations is not intended to be limiting. As discussed herein with reference to FIG. 2, a battery management system, BMS 204 is utilized by, for example, an on-board computer system 224 to control the electrical power discharge of the traction battery 202 and/or hybrid range extender battery 222 so that the power supply system 200 can be operated in a more efficient and power saving mode to increase the distance of operation of the vehicle or prevent the degradation of a module caused by a single cell. For example, during a journey, one or more embodiments described herein include an on-board computer system 224 that will estimate the electrical power requirements to navigate to a destination and determine if the vehicle can safely reach the destination using the stored energy available to operate. If the computer system 224 determines that the vehicle cannot reach the predetermined destination, the traction battery 202 may be charged using the hybrid range extender battery 222 to provide enough power for the journey.

In one or more embodiments, the high energy density hybrid modules 212 are configured to have a single chemistry whereas in one or more other embodiments, the high energy density hybrid modules 212 are configured to have multiple chemistries (for example, three chemistries for daily, weekly and monthly use).

In an illustrative embodiment, the traction battery 202 comprises a single traction module 220 or a plurality of traction modules 220 connected in series. In another illustrative embodiment, the hybrid range extender battery 222 has a plurality of high energy density hybrid modules 212 connected in parallel with each other and also in parallel with the traction battery 202, allowing each of the high energy density hybrid modules 212 to manage their contribution to the charging of the traction battery 202 or powering of the vehicle. While in use, the high energy density hybrid modules 212 may desirably only charge the traction battery 202 at defined rates to decouple the changing load requirements of the vehicle from the high energy density hybrid module 212.

In one or more embodiments, the batteries that can be utilized in the hybrid range extender battery 222 described herein to provide power to vehicle or charge the traction battery 202 may include batteries having anode-free or lithium metal cells with cell energy densities of between 700 and 1500 Wh/L or between 1000 and 1500 Wh/L or between 1200 and 1500 Wh/L or about 1200 Wh/L.

Battery systems in electric vehicles are typically traction batteries and are made up of hundreds of cells that are packed together. These systems, with a voltage rating of, for example, 300V to 400V, supply current as high as about 300 A (e.g., 200-300 A), and any mismanagement could trigger significant disaster. Battery management systems (BMS) are thus essential in electric vehicles for the safe operation of the high-voltage batteries. They may be configured to monitor the state of the batteries, prevent overcharging and discharging that may reduce the battery's life span, capacity and even cause explosions. For instance, a BMS checks the power voltage, and when the required voltage is reached, it may stop the charging process. In case irregular patterns in the power flow are detected, BMSs may shut down and send out an alarm. Moreover, BMSs may be configured to relay the information about the battery's condition to energy and power management systems. In addition, they may regulate the temperatures of the battery cells, and also the battery's health, making it safe and reliable under all conditions.

One of the desirable features of a BMS is to estimate the state-of-charge (SOC) of a battery pack as it desirable, or even critical to efficiently maintain the SOC of the battery packs to ensure that the voltage of the battery is not be too high or too low. For example, the battery may not be charged beyond 100 percent or discharged below 30% percent SOC as this may reduce the capacity of the battery cells. Besides, a BMS may not only provide precise information on the voltage and temperature of the battery but may also give an idea of the energy available for use and the remaining battery charge.

In measuring a SOC, a voltmeter may be used as the battery pack voltage may decrease more or less linearly during the discharging cycle of the battery. Moreover, in a coulomb-counting process, the current going into or coming out of a battery may be integrated to produce the relative value of its charge. However, it may typically not be possible to accurately determine the SOC and other characteristics of individual cells of the battery pack, especially for cells connected in series.

The illustrative embodiments therefore recognize that conventional BMSs may not be capable of accurately measuring the individual characteristics of cells in a battery pack as they may only obtain estimates and may have no way of controlling the current of a cell to measure corresponding characteristic parameters, such as voltage, of the cell. These are values that may be needed to strictly control, in a repeatable manner, the charging ang discharging of cells to achieve a defined cycle life requirement.

Turning back to FIG. 1A and FIG. 1B, anode-free cell 100 is shown. Though the following descriptions and figures may refer generally to anode-free cells, persons skilled in the art may recognize that lithium metal cells are likewise contemplated. For example, the operating voltage ranges, electrolytes, charge and discharge rates may also apply to lithium metal cells. The anode-free cell 100 comprises a cathode 102, a separator 104, a cathode current collector 106, and an anode current collector 108. The cathode current collector 106 may be a conductive film that is layered with the cathode. The cathode current collector 106 may, for example, be an aluminum foil. Other forms of conductive foils are possible. The cathode 102 may, for example, be NCM (nickel-manganese-cobalt).

The cathode 102 may have a first surface in contact with the cathode current collector 106, an opposite surface of cathode 102 may be in contact with separator 104. The separator may prevent a direct electrical connection between the cathode 102 and the anode current collector 108. In this configuration, prior to a first charging cycle, the anode-free cell 100 does not have an anode or lithium layer 110. The separator 104 may have characteristics that further inhibit dendrite growth. The separator 104 may be solid state. Further, the separator may be a porous polyolefin layer with a coating or ceramic nanoparticles. Non-ceramic (aka polymer) separators including PE (Polyethylene), PP (Polypropylene), poly-aramid such as Kevlar may also be included.

Figure 1B:
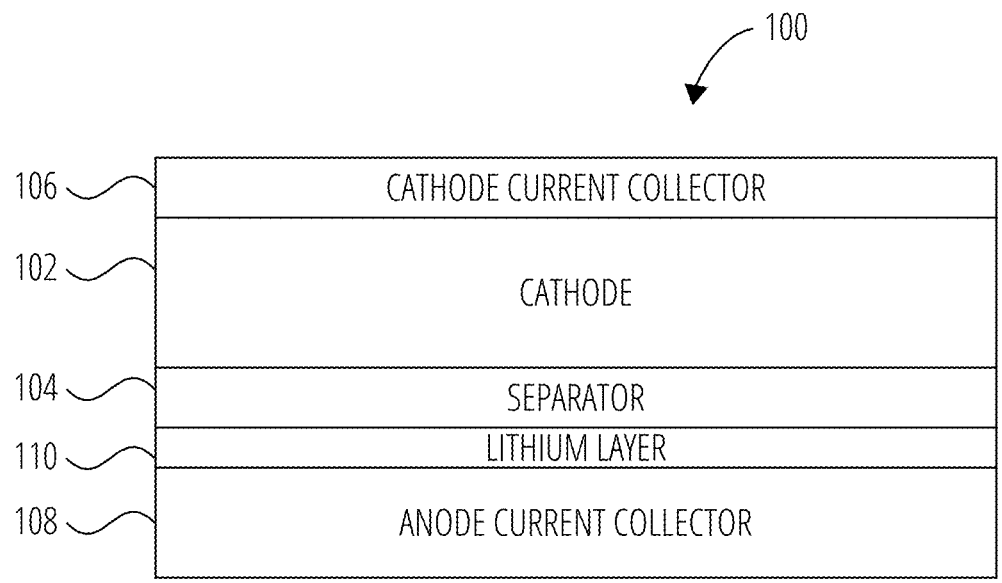
FIG. 1B depicts an anode-free cell after a charging operation in accordance with one or more embodiment.

The separator 104 may have a first surface in contact with the cathode 102 and a second surface opposite the first surface in contact the anode current collector 108. In some embodiments, the anode current collector 108 is a conductive foil, such as a copper foil. In other embodiments, it is a coated copper foil (i.e. a primer layer may be applied, the layer may include carbon black or a polymer or both. The coating may also be another metal such as chrome, chromate, zinc or tin.), a nickel foil, a metal mesh, a metalized polymer film, a graphene foil, a zinc coated foil (i.e., for example a copper or nickel foil or mesh coated with zinc.), or a tin coated foil (i.e., for example a copper or nickel foil or mesh coated with tin.). As shown in FIG. 1B, lithium ions, provided by the active cathode material, are deposited as metallic lithium (lithium layer 110) onto the anode current collector 108. An electrolyte of the anode-free cell may comprise lithium difluoro(oxalato)borate, lithium tetrafluoroborate and a solvent component. However, other electrolytes may be used. Further, the cathode may be, for example, Lithium Nickel Manganese Cobalt Oxides (NMC)-Li(NixMnyCoz)O2 where $0 \leq x+y+z \leq 1$, Lithium Manganese Oxide (LMO)-LiMn2O4, Lithium Manganese Iron Phosphate (LMFP)-LiMnxFeyPO4 where $0<x+y<1$, Lithium Iron Phosphate (LFP)-LiFePO4, or Lithium Cobalt Oxide (LCO)-LiCoO2. These are not meant to be limiting.

Figure 2:
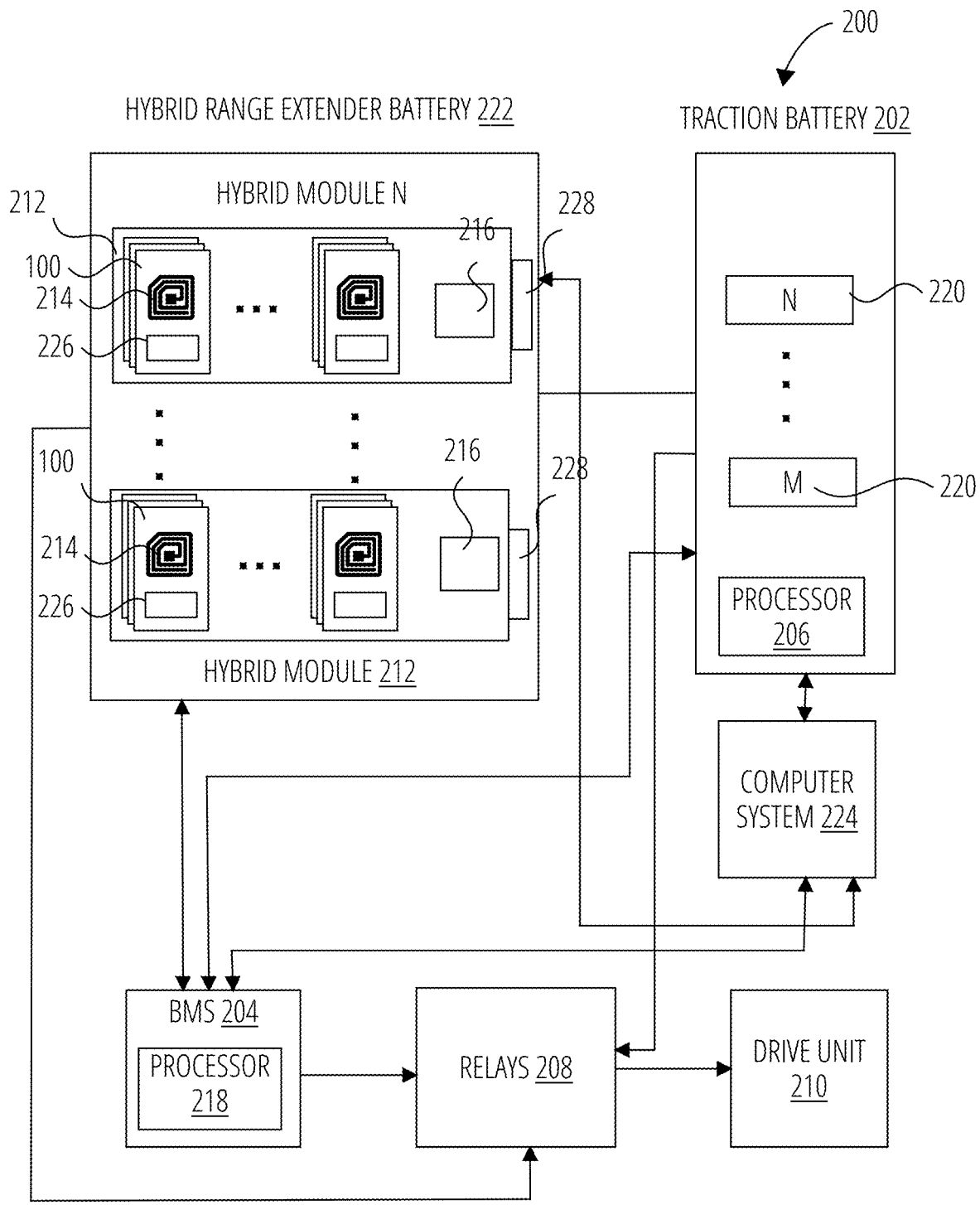
FIG. 2 depicts a block diagram of a power supply system in accordance with one or more embodiments.

Turing back to FIG. 2, the traction battery 202 may include one or more traction modules 220 configured to power the vehicle. The hybrid range extender battery 222 may be designed to be modular, having one or more than one type of chemistry, different form the chemistry of the traction battery 202, for the purpose of providing the vehicle with its varying power requirements when needed. The chemistry may include at least an anode-free chemistry. Thus, the hybrid range extender battery 222 may be designed to have one or a plurality of high energy density hybrid modules 212 or packs that are configured with respective bi-directional DC-DC converters 228 to act as standalone batteries. By being able to independently control the high energy density hybrid modules 212, and independently measure the health or state of its individual anode-free cells 100, a charging and discharge rate the anode-free cells 100 can be regulated. In an embodiment, anode-free cells 100 of the high energy density hybrid modules 212 are arranged in series. By using a balance device 226 such as a bleeder resistor connected in parallel with each anode-free cell 100, a rate of charging or discharging of the anode-free cell 100 can be controlled, i.e., turning on the bleeder resistor for a cell, discharges the electric charge stored in the cell. Further, one or more sensors 214 (such as a voltage sensor) are used to measure a state of the individual anode-free cells 100 and/or the high energy density hybrid module 212.

In an embodiment, each high energy density hybrid module 212 also has an operatively coupled hybrid module controller 216 for measuring the health or state of the anode-free cells 100. For example, a hybrid module controller 216 can be configured to measure the voltage, current, temperature, SOC (State of Charge), SOH (State of Health) for all cells of the corresponding high energy density hybrid module 212. It may also have a DC-DC converter control to allow isolation and current to be managed and throttle their contribution, both absorbing and providing energy to a main bus/high voltage DC-DC bus of the power supply system 200. The system may also have a BMS 204 configured to primarily communicate with the traction battery 202. In case a traction battery 202 malfunctions, one of more of the high energy density hybrid module 212 can act as a replacement, (e.g., temporary replacement) for the traction battery 202 by supplying power directly to the drive unit 210. This allows fulfilment of the This One or more processors (processor 218, processor 206 or a processor of computer system 224) are used in a number of configurations to enable the performance of one or more processes or operations described herein. Relays 208 are controlled to operatively couple a drive unit 210 of the vehicle to power from the power supply system 200. The drive unit 210 may collectively refer to devices outside the power supply system 200 such as a propulsion motors, inverter, HVAC (Heating, Ventilation, and Air Conditioning) system, etc.

In an embodiment, the plurality of high energy density hybrid modules 212 may be connected in parallel to a main traction bus/high voltage DC bus, a plurality of traction modules 220, and a plurality of bi-directional DC-DC converters 228. In addition, it may have an on-board AC-DC charger, a 12 V battery for powering lights and ignition of the vehicle, an auxiliary DC-DC converter for connecting the 12 V battery to the lights and ignition, contactors for switching various circuits on or off, and a control module for controlling the power supply. An operatively coupled hybrid module controller 216 such as an on-board hybrid module controller 216 is configured to measure the voltage, current, temperature, SOC and SOH of the each of the individual anode-free cells 100. Each of the anode-free cells 100 may have a voltage sensor 214. Knowing the current passing through the anode-free cell 100 and temperature (such as temperature of various points on the high energy density hybrid module 212), the SOH, SOC and other parameters for the anode-free cells 100 can be calculated to determine whether energy output of the corresponding high energy density hybrid module 212 can be connected to the traction battery 202. Moreover, by using a bi-directional DC-DC converter for each high energy density hybrid module 212, the current input and output for each high energy density hybrid module 212 can be precisely controlled unlike in load following conventional solutions which have no control over changing drive power. In an illustrative embodiment, charge and discharge pulses are generated for the high energy density hybrid modules 212. By controlling the current for the series connected anode-free cells 100 of the high energy density hybrid module 212 through a bi-directional DC-DC converter 228 and measuring the voltages of each of the anode-free cells 100, the impedances of said each of the anode-free cells 100 are computable and comparable to reference data, to identify any unwanted deviations in a cell impedance and a corresponding change in the health of the cell.

Further, the hybrid module controller 216 may manage the strain of the anode-free cells 100 by monitoring and bringing them into alliance. For example, when one anode-free cell 100 (Cell A) is determined to be at a lower SOC (e.g., 20%) than another anode-free cell 100 (Cell B) that is connected in series (70%), Cell B will reach a full charge earlier than Cell A, thus requiring the charging of Cell B to be halted to prevent overcharging it. By reducing the SOC of Cell B to that of Cell A using the balance device 226 (e.g., bleeder resistor), Cell A and Cell B can both be charged at the same rate to a predetermined full charge. Thus, the hybrid module controller 216 may keep the SOC of the anode-free cells 100 equal or substantially equal (e.g., within +/−10%, or +/−5%, +/−1%,) such that a defined range of the module can be used. In another example, by determining anode-free cells 100 with lower self-discharge rates than that of other anode-free cells 100, the hybrid module controller 216 determines which anode-free cells 100 to selectively discharge to a determined charge to subsequently charge all anode-free cells 100.

In another illustrative embodiment, because the high energy density hybrid modules 212 are connected in parallel to each other and independently controlled, an individual high energy density hybrid module 212 is separately removable for reconditioning by slowing charging and discharging within a selected SOC range without affecting the normal operation of the power supply system 200.

Having described the general architecture of the power supply system 200, methods of operating the power supply system 200 and the anode-free cells will be discussed. As stated earlier, to achieve a cycle life requirement for real-world applications, said the anode-free cells 100 and thus the power supply system 200 may have to be operated under strict conditions at all times. This may be achieved by not causing the anode-free cell to fully discharge. Thus, repeatedly leaving an optimal buffer/fuel reservoir, i.e., the "permanent" layer of lithium, corresponding to a lower cutoff voltage of the anode-free cell, by careful depletion of the layer of lithium formed during the first charging cycle, a surprisingly higher cycle life (e.g., about 200 cycles or more) than that provided by conventional anode-free cells is achieved without sacrificing anode-free cell energy density (e.g., about 1200 Wh/L or more). In one embodiment, on a first charge, a thickness Tmax of the lithium layer may be formed at the upper cutoff voltage. On discharging to the lower cutoff voltage, a thickness Tmin, corresponding to "permanent" layer of the lithium layer may be formed. It may be conceivable that Tmax and Tmin may both shrink in each subsequent cycle due to Lithium degradation and/or applied uniaxial pressure. In other circumstances, it may also be conceivable that the thickness may gradually increase/swell with the subsequent cycles, due to a growth of a solid-electrolyte interlayer between the lithium metal layer and the separator. This solid-electrolyte interlayer (aka SEI) may result from a reaction between optimized electrolyte constituents (specifically the lithium containing salts and the selected solvents) that stabilize the coulometric efficiency of the lithium anode during repeated cycles. A cycling protocol may be enabled by the BMS 204 wherein the voltage cutoffs may be adjusted based on a SOC to preserve lithium thickness.

Figure 3:
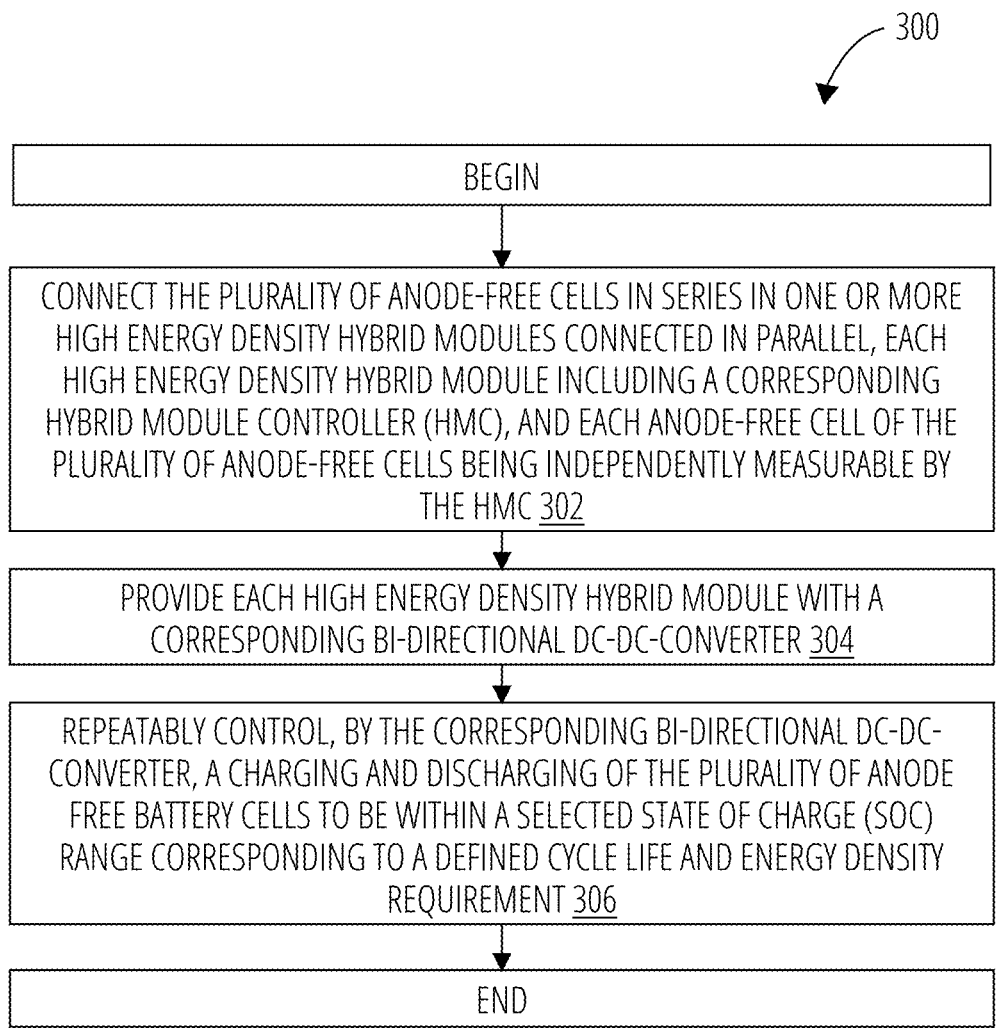
FIG. 3 depicts a process in accordance with one or more embodiments.

FIG. 3 illustrates a process 300 that may provide a repeatable operation or control of one or more anode-free cells 100. In step 302, the plurality of anode-free cells is connected in series in one or more high energy density hybrid modules connected in parallel, each high energy density hybrid module including a corresponding hybrid module controller (HMC), and each anode-free cell of the plurality of anode-free cells being independently measurable by the HMC. In step 304, each high energy density hybrid module is provided with a corresponding bi-directional DC-DC converter 228. In step 306, process 300 controls, by the corresponding bi-directional DC-DC-converter, a charging and discharging of the plurality of anode free battery cells to be within a selected state of charge (SOC) range corresponding to a defined cycle life and energy density requirement. This control may be repeated throughout the use of the anode-free cells to ensure the strict operating parameters are adhered to.

Figure 6:
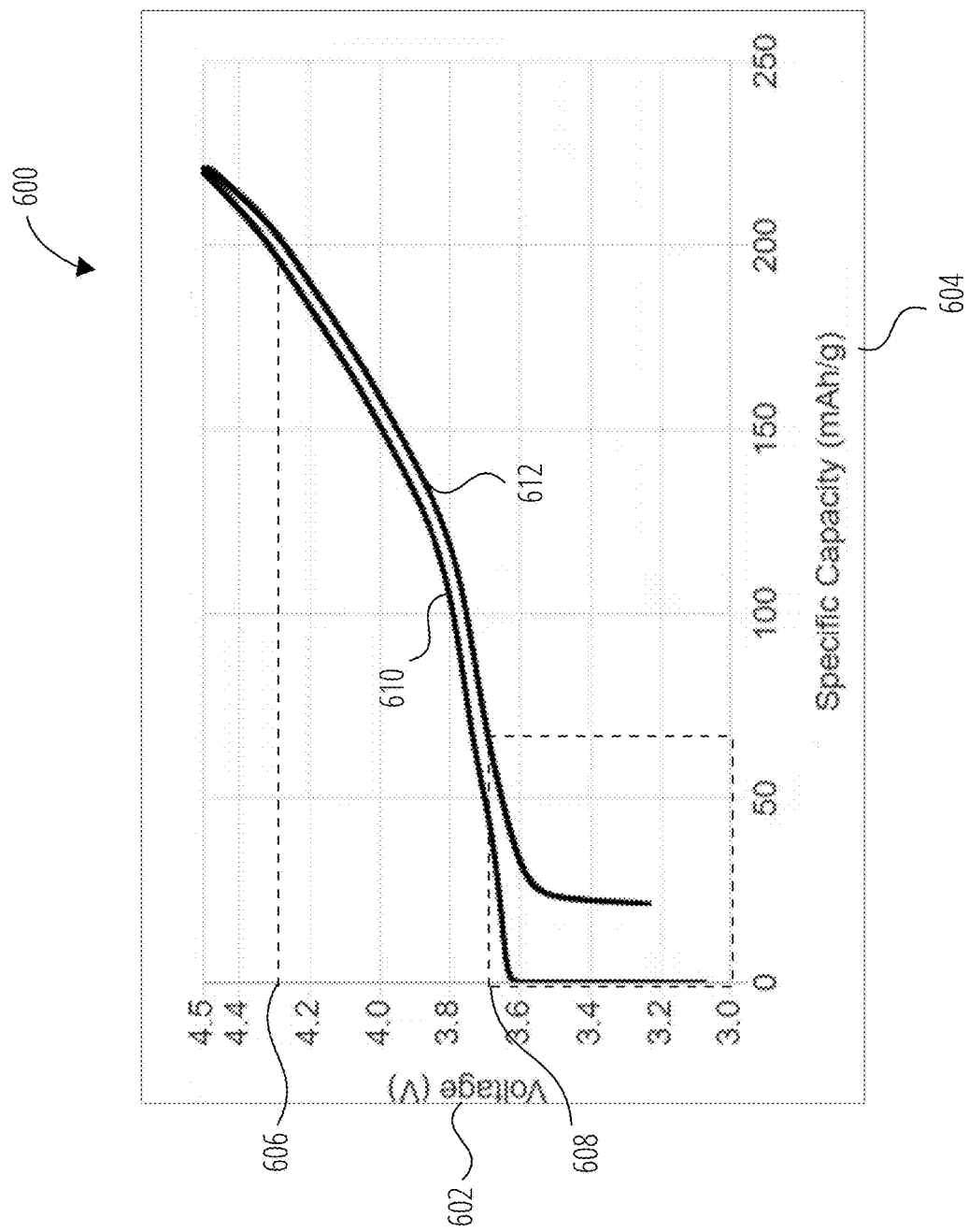
FIG. 6 depicts a voltage profile in accordance with one or more embodiments.

In one aspect, an operating voltage range of one or more of the anode-free cells 100, the operating voltage range corresponding to the selected SOC range and comprising an upper cutoff voltage 606 and a lower cutoff voltage 608, as shown in FIG. 6, is obtained. By not charging or discharging the anode-free cell 100 beyond the upper cutoff voltage 606 and the lower cutoff voltage 608 respectively, the defined cycle life and energy density requirement may be achieved. Other operating parameters such as a defined pressure applied to each of the plurality of anode-free cells may ensure achieving the cycle life and energy density requirement. In an embodiment, a uniaxial pressure of less than 60 psi is applied. In another embodiment, a uniaxial pressure of less than 30 psi (or between 10-30 psi) is applied. Further, the plurality of anode-free cells may each have a stacked electrode configuration wherein the anode-free cell is assembled by cathode/separator/anode sub-units stacked in the same direction, e.g. a z-direction. The cathode and anode (or current collector) may be discrete (cut apart) opposed to be 'folded' or continuous. The separator layer may be cut/discrete or continuous/folded("Z-fold") Alternatively, each anode-free cell 100 may have a wound electrode configuration wherein the layers face each other and are wound to form a cylindrical or wound flat (pouch or prismatic) cell.

The processes may be carried out wholly or at least partially by a processor of the vehicle, using a bi-directional DC-DC converter 228. The charging and discharging of the anode-free cells to be within the selected SOC range may be achieved by measuring a voltage 602 of said at least one anode-free cell using the corresponding HMC 216. In an example, responsive to determining that the lower cutoff voltage is reached during a discharge cycle, the discharge of the anode-free cell 100 (e.g., Cell X) is stopped. No further discharge may be allowed. This may ensure that the lower cutoff voltage 608 is not exceeded. A charging cycle of Cell X may subsequently begin to restore lost energy. During the charging process, responsive to determining that the upper cutoff voltage 606 is reached, the charging may be stopped to ensure that the upper cutoff voltages 606 is not exceeded. A discharge cycle may subsequently follow when power is needed from Cell X. In the power supply system 200, the charging and discharging of the anode-free cells 100 may be executed on a per high energy density hybrid module 212 basis, wherein the anode-free cells in the chosen high energy density hybrid module 212 are charged and discharged at the same rate. However, the balance device 226(bleeder resistor) may be used in one or more ways to bring all anode-free cells in a chosen high energy density hybrid module 212 to a same SOC. For example, upon determining that an anode-free cell in the chosen high energy density hybrid module 212 is at a higher SOC than that of the remaining anode-free cells in the chosen high energy density hybrid module 212, said anode-free cell may be discharged to a same SOC as that of the remaining anode-free cells using the balance device 226. Other technical features and processes may be readily apparent to one skilled in the art from the descriptions.

Figure 7:
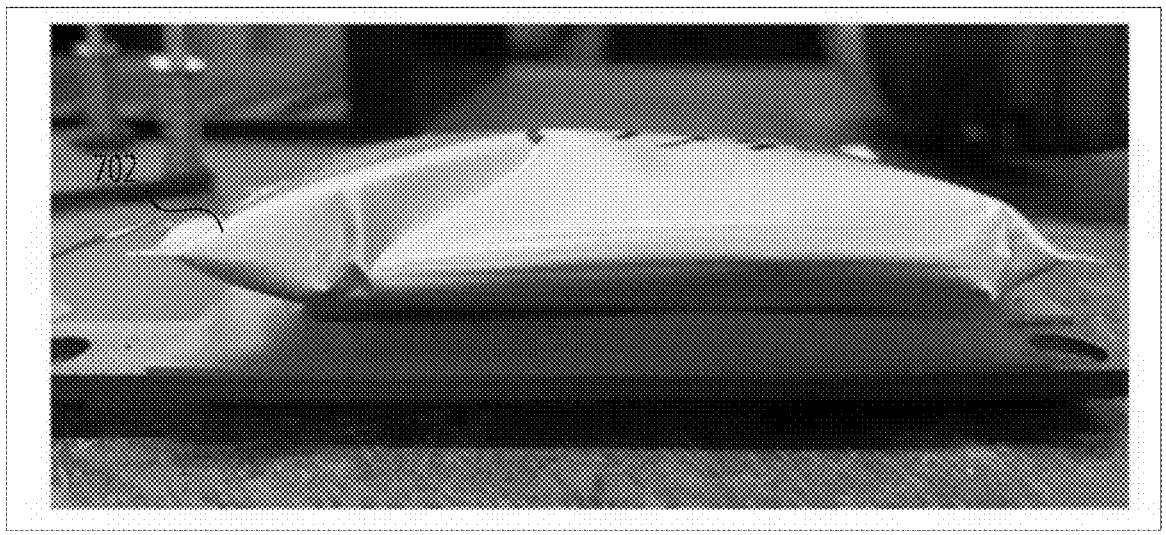
FIG. 7 depicts a cell with gassing in accordance with one or more embodiments.
Figure 8:
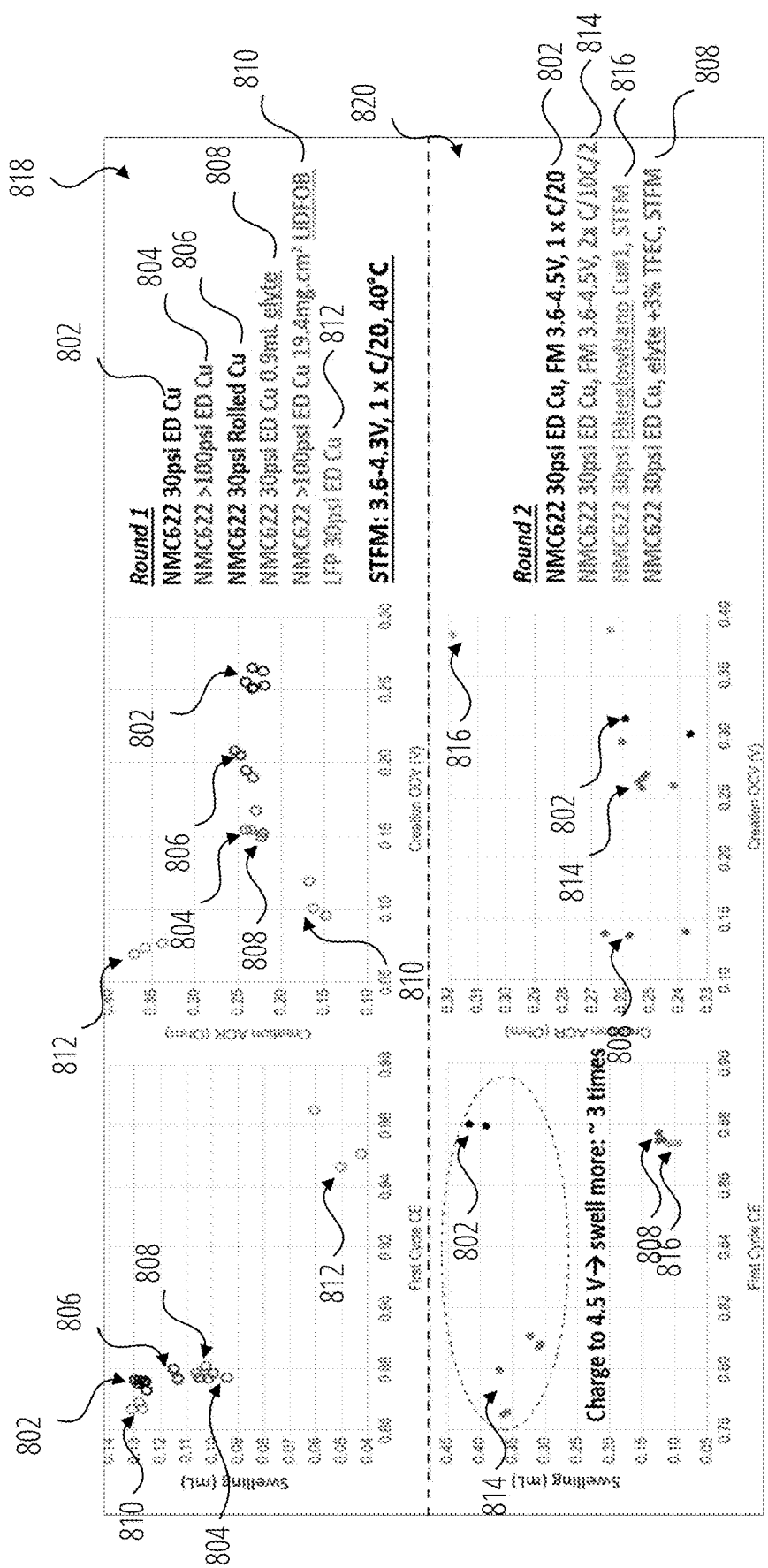
FIG. 8 depicts a plot illustrating cell gas generation in accordance with one or more embodiments.

In an aspect, the cathode 102 of an anode-free cell 100 may be selected to produce a corresponding voltage profile 600 that has voltages that substantially or fully fall below a gassing voltage of an electrolyte of the anode-free cell. As shown in FIG. 7, electrolytes of anode-free cells may generate gasses due to electrolyte decomposition that may create deformed swollen cells 702 and make them commercially unusable. Surprisingly, selecting a unique material type of the cathode or combination of material types may provide a cathode having a corresponding voltage profile 600 that falls below a defined gassing voltage (e.g., about 4.3V or less). It has been found that operating the cells below this gassing voltage may provide a cell chemistry that is less prone to gassing issues. FIG. 8 illustrates a plot showing that changing the upper cutoff voltage to 4.5 V from 4.3 V in at least NMC622 cells 802 about triples swelling (~0.13 in the first plot 818→~0.4 mL in the second plot 820). Plots of other chemistries and test conditions including NMC622>100 psi ED Cu 804, NMC6CC 30 psi Rolled Cu 806, NMC 622 30 psi ED Cu 0.9 mL elyte 808, NMC622>100 psi ED Cu 19.4 mg·cm² LiDFOB 810, LFP 30 psi ED Cu 812, NMC622 30 psi ED Cu, FM(formation) 3.6-4.5V, 2× C/10C/2 814, and NMC622 30 psi BlueglowNano Cu #1, STFM 816 are shown, wherein "mg·cm^2" is the area specific loading of the cathode used in the demonstration cell, as milligram of cathode active material (e.g. NMC) per square centimeter of the cathode layer. These are not meant to be limiting and are shown for illustration.

Figure 9:
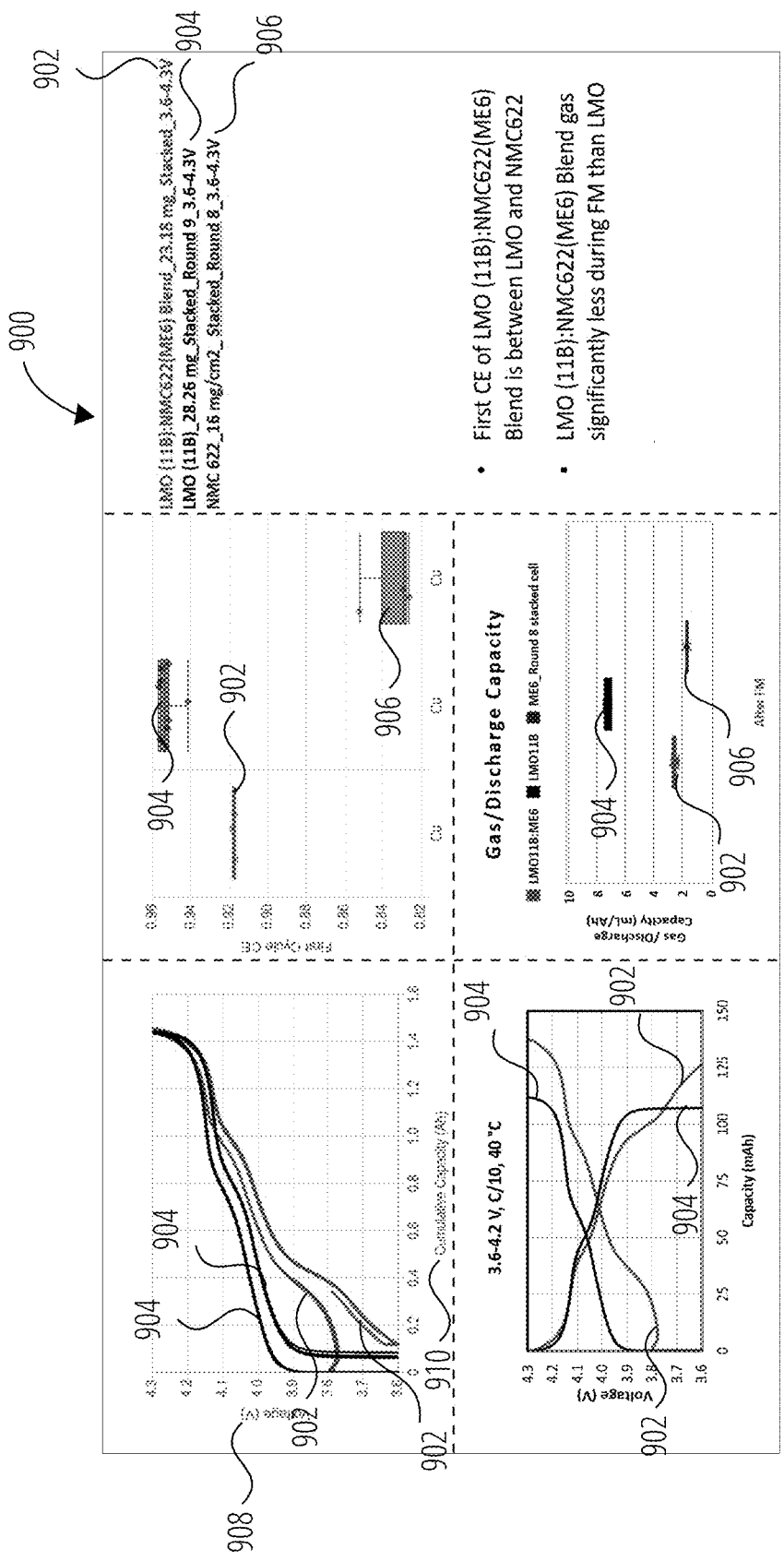
FIG. 9 depicts an LMO:NMC622 cathode blend comparison to other cathodes in accordance with one or more embodiments.

Selecting the cathode or combination of materials for the cathode may however not be simple. FIG. 9 shows an example plot (LMO:NMC622 blend study 900) illustrating a surprisingly substantial reduction in the operating voltages 908 of an LMO:NMC cathode blend in comparison with an LMO cathode. Separate test conditions included LMO (11B):NMC622(ME6) Blend_23.18 mg/cm2_Stacked configuration_3.6-4.3V 902, an LMO (11B)_28.26 mg/cm2_Stacked_Round 9_3.6-4.3V 904, and NMC 622_16 mg/cm2_Stacked_Round 8_3.6-4.3V 906, wherein "V" represents the voltage range and mg/cm2 represents the mass loading of cathode material on the cathode current collector. By comparing the LMO:NMC blend with the LMO cathode, it can be seen that voltages for the same cumulative capacities 910 are reduced in the LMO:NMC Blend of cathode relative to the LMO cathode, making it even easier to select a cathode that provides an upper cutoff voltage and a lower cutoff voltage which fall below an identified gassing voltage (e.g., 4.3V). It can be further seen that a gas-discharge capacity of the LMO:NMC blend is substantially lower than that of LMO.

Figure 10:
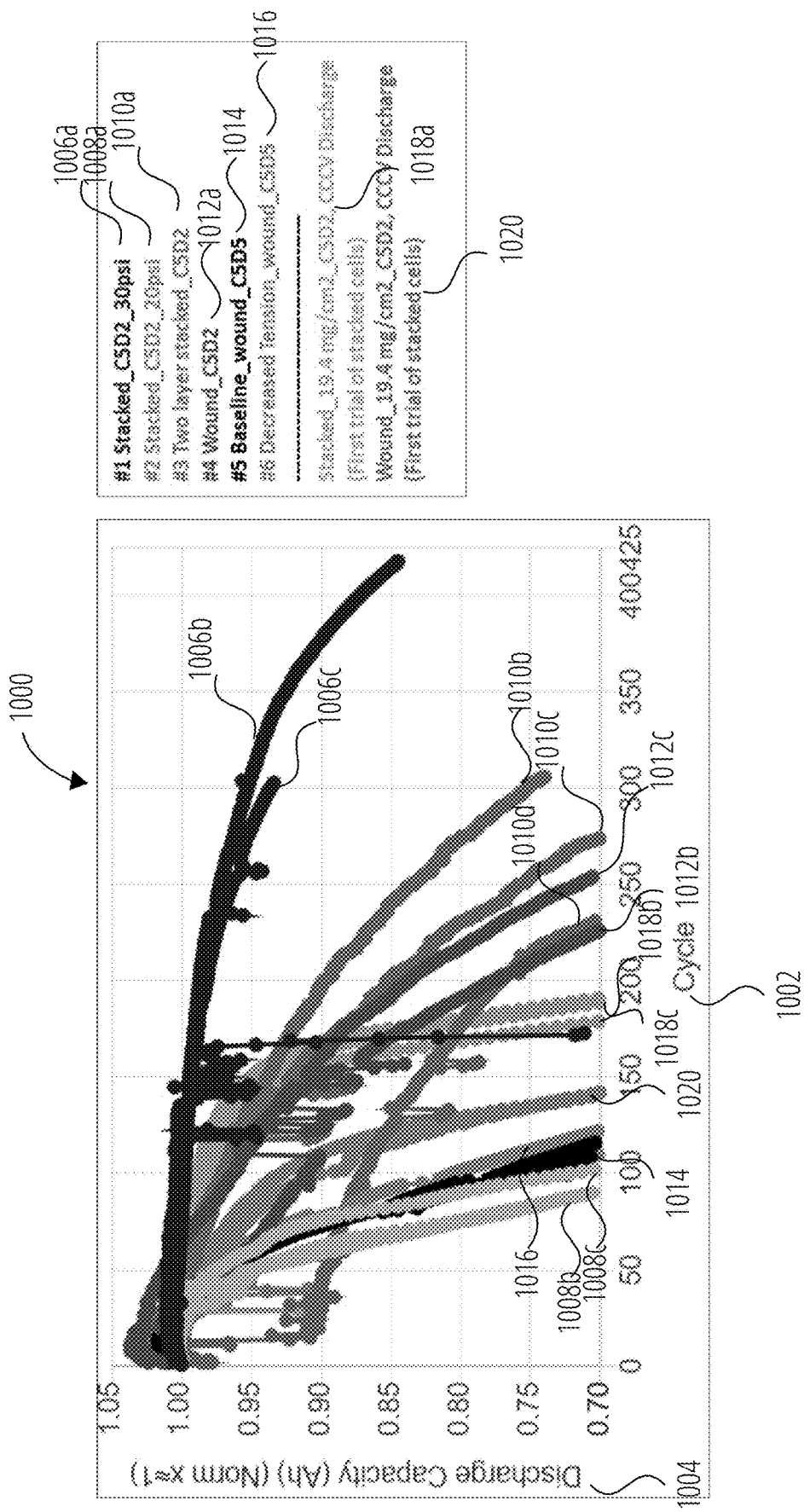
FIG. 10 depicts a discharge capacity-cycle plot in accordance with an illustrative embodiment.

FIG. 10 further shows a discharge-capacity/cycle plot 1000 illustrating how the use of the power supply system 200 to precisely control charging and discharging leads to significant increases in cycle life 1002. A baseline test 1014 (Baseline_wound_C5D5) uses a wound electrode configuration of anode-free cells, with a controlled charging and discharging rate of C/5 and D/5 (i.e. 5 hour charging and 5-hour discharging). Parameters used for the baseline test also included an electrolyte of: 1.6M LiDFOB+1.12M LiBF4 FEC:DEC 1:2 v:v, a cathode of: NMC622_16 mg/cm² (mass loading), operating voltages from 3.7-4.3 V, cycling at 30° C. (15 min rest), and uniaxial pressure of 30 psi. Other tests in FIG. 10 utilized the baseline parameters, with specified alterations (as discussed below) to observed corresponding cycle life values. This baseline test 1014 is compared with other tests that may be duplicated or triplicated as shown in FIG. 10. By reducing the discharging rate to D/2 (2 hour discharge) and precisely controlling the charging and discharging to be 5 hour charging and 2 hour discharging, as is shown in "Wound_C5D2" 1012a, the cycle life (to 80%) may be more than doubled from about 100 cycles to about 200 cycles as shown in at least one of the duplicated tests for "Wound_C5D2" 1012a (1012c). However, surprisingly, using a stacked electrode configuration with a uniaxial pressure of 30 psi, a 5 hour charging, and 2 hour discharging, exceedingly higher cycle life values were obtained as shown by "Stacked_C5D2_30 psi" 1006b with a cycle life(to 85%) of more than 400 cycles. It can be seen that "Stacked_C5D2_30 psi" 1006b provided the best cycling performance of the tests in FIG. 10. Other tests include "Two layer stacked_C5D2" 1010a, wherein a stacked cell with two layers of cathode (sandwiched in 3 layers of anode) is used, "Decreased Tension_wound_C5D5" 1016 packaging wherein the cell conditions were made worse by creating further nonuniformity in pressure in the winds (where no pressure is applied), "Stacked_C5D2_20 psi" 1008a, wherein a stacked electrode configuration pf cells having a uniaxial pressure of 20 psi and a 5 hour charging and 2 hour discharging were used. In other tests "Stacked_19.4 mg/cm2_C5D2, CCCV Discharge (First trial of stacked cells)" 1018a, and "Wound_19.4 mg/cm2_C5D2, CCCV Discharge (First trial of stacked cells)" 1020 a mass loading of cathode material coated was altered from 16 mg/cm2 to 19.4 mg/cm2 (i.e., a 'thicker' cathode, which may lead to a thicker layer of lithium depositing on the opposite anode side). "CCCV" may refer to 'constant current, constant voltage', wherein the anode-free cell may have a constant current applied during discharge until it reaches the lower cut off lower cutoff voltage 608, at which point the cell may be kept at that voltage, while adjusting the current to maintain that voltage until the current drops below a certain value, at which point the cell may be considered/defined as 'discharged'. At any applied current, the measured voltage of the cell may be the electrochemical voltage of the electrodes plus the voltage due to resistance (V=IR Ohm's law). For example, the actual electrochemical voltage of the cell may be 3.8V, but the resistance may be 0.05 Ohm, and if the current is −2 A (negative because of discharge), then the measured voltage may be 3.8−(2*0.05)=3.7V. By not stopping discharging there, the 'CV' mode may commence which decreases the applied current while maintaining the same voltage to ensure that 3.7V is actually achieved. This may serve as a significant advantage as the applied current and voltage to the anode-free cells may be defined without impacting vehicular performance.

Figure 11:
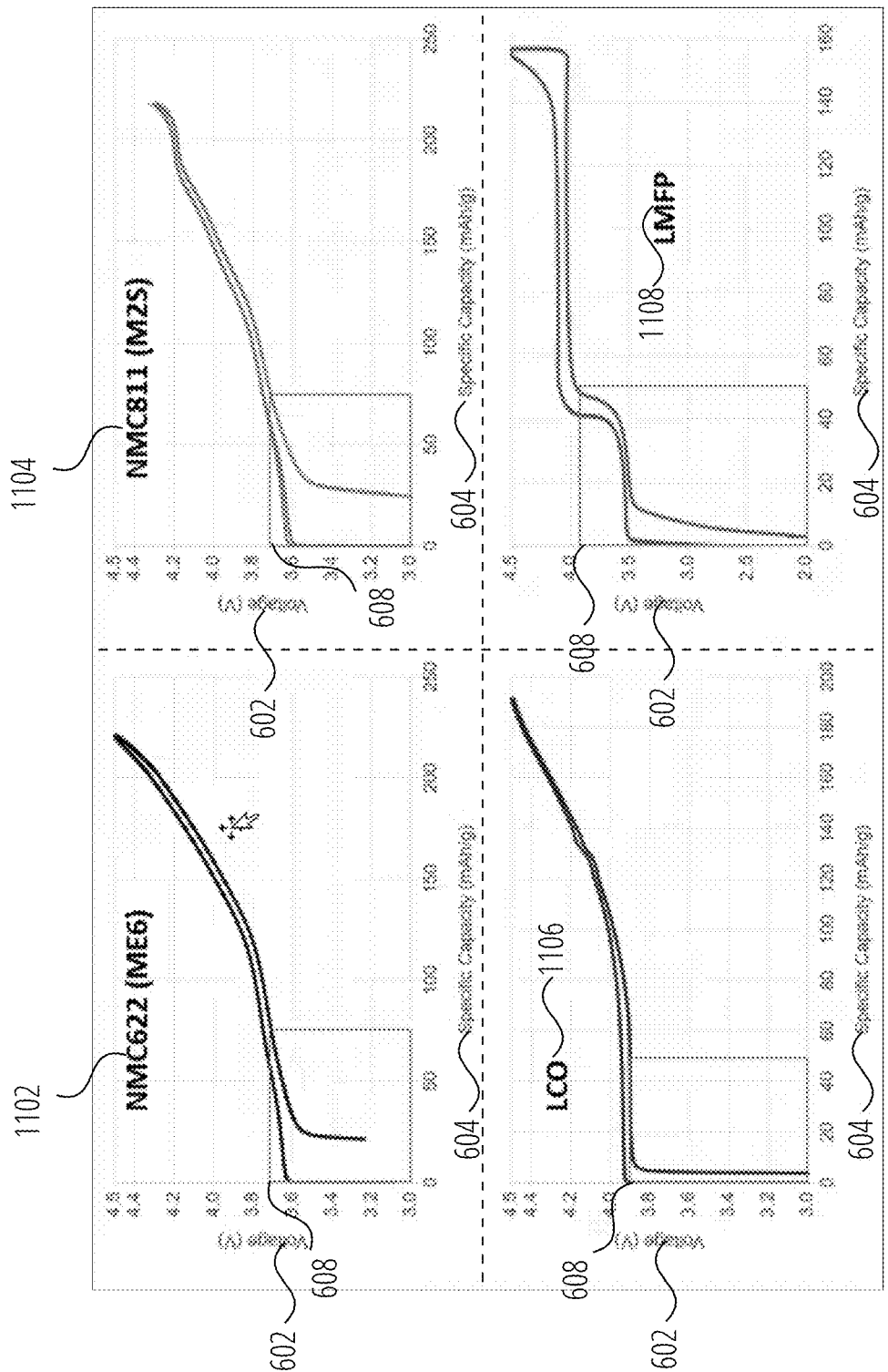
FIG. 11 depicts voltage profiles in accordance with one or more embodiments t.

In one or more embodiments, the lower cutoff voltage 608 of the anode-free cells may be selected to correspond to about 30% (25%-35%) of a state of charge of the plurality of anode-free cells. More generally, the charging and discharging of each anode-free cell of the plurality of anode-free cells are controlled to be within the selected SOC range during use. Table. 1 and FIG. 11 show example operating voltages observed for corresponding cathode types.

TABLE 1

Operating voltages.

| Cathode | Lower cutoff voltage | Upper cutoff voltage |
| --- | --- | --- |
| NMC622 | 3.7 V | 4.2 V-4.4 V |
| NMC811 | 3.7 V | 4.2 V-4.4 V |
| LCO | 3.9 V | 4.2 V-4.4 V |

TABLE 1-continued

Operating voltages.

| Cathode | Lower cutoff voltage | Upper cutoff voltage |
| --- | --- | --- |
| LMFP | 3.95 V | 4.2 V-4.4 V |
| LFP | 3.4 V | 3.6-3.8 V |

In some embodiments, the lower cutoff voltage may further correspond to a range of 10% to 15% of a state of charge of anode-free cells. Further, though upper cutoff voltage 606 may generally be about 4.3V, by fixing potential gassing issues, higher upper cutoff voltages 606 may be achieved (e.g., 4.4V).

By observing the operating parameters of the anode-free cells 100, a battery pack having energy density of about 1200 Wh/L, cycle life (to 80%) of about 200 or more, uniaxial pressure <60 psi (e.g., 30 psi or less, or between 10-30 psi), charge and discharge rates of about 0.1C and 0.3D respectively, and temperature of 10-40° C. may be achieved. 35. Further, by observing the operating parameters of the anode-free cells 100, a battery pack having energy density of about 1200 Wh/L, a Cycle Life (to 80%) of about 350, a uniaxial pressure on cells of about 30 psi, a charge and discharge rates of about 0.2C, 0.5D respectively and an operating temperature of 10-40° C. may be achieved.

Of course, the examples shown herein are not meant to be limiting and other technical features may be readily apparent to one skilled in the art from the provided descriptions.

Figure 4:
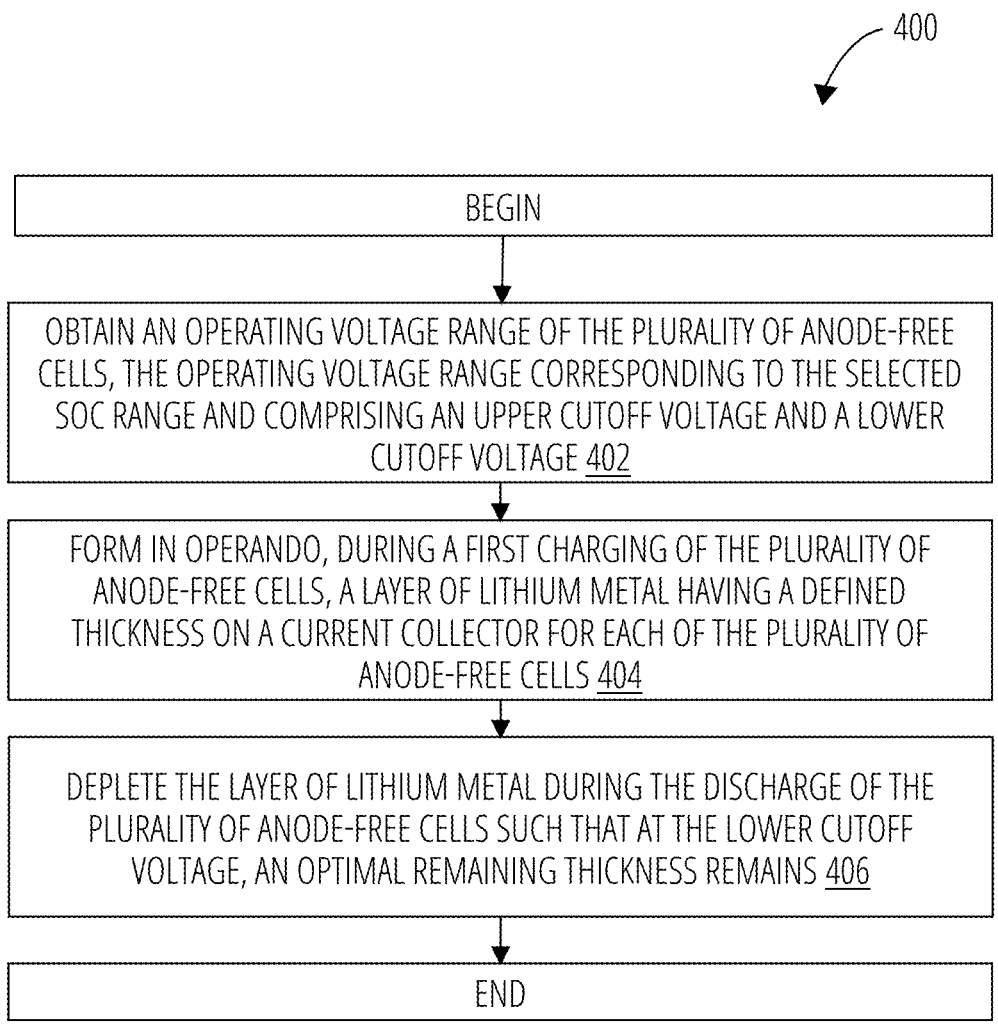
FIG. 4 depicts a process in accordance with one or more embodiments.

FIG. 4 depicts another process 400 in accordance with some embodiments. In the process 400 a repeatable operation of a plurality of anode-free cells in a power supply system 200 may be provided. In step 402, process 400 obtains an operating voltage range of the anode-free cells 100, the operating voltage range corresponding to a selected SOC range and comprising the upper cutoff voltage 606 and the lower cutoff voltage 608. In step 404, process 400 forms in operando, during a first charging of the plurality of anode-free cells, a metallic lithium layer 110 having a defined thickness on the current collector 108 for the anode-free cells. The defined thickness may range from 10 μm to 25 μm. A desirable defined thickness may also range from 16 μm to 20 μm.

In step 406, process 400 depletes the layer of lithium metal during the discharge of the plurality of anode-free cells such that at the lower cutoff voltage, an optimal remaining thickness of the lithium metal remains. In an embodiment, the optimal thickness ranges from 2 μm to 7 μm. A desirable remaining thickness may range from 3 μm to 4 μm. Said remaining thickness may be a same or similar percentage of the defined thickness as the percentage of SOC that is desired to be remaining at the lower cutoff voltage 608 (e.g., 30%). Further, a uniaxial pressure applied to the anode-free cells 100 may be selected to be about 30 psi to provide a high cycle life.

Figure 5:
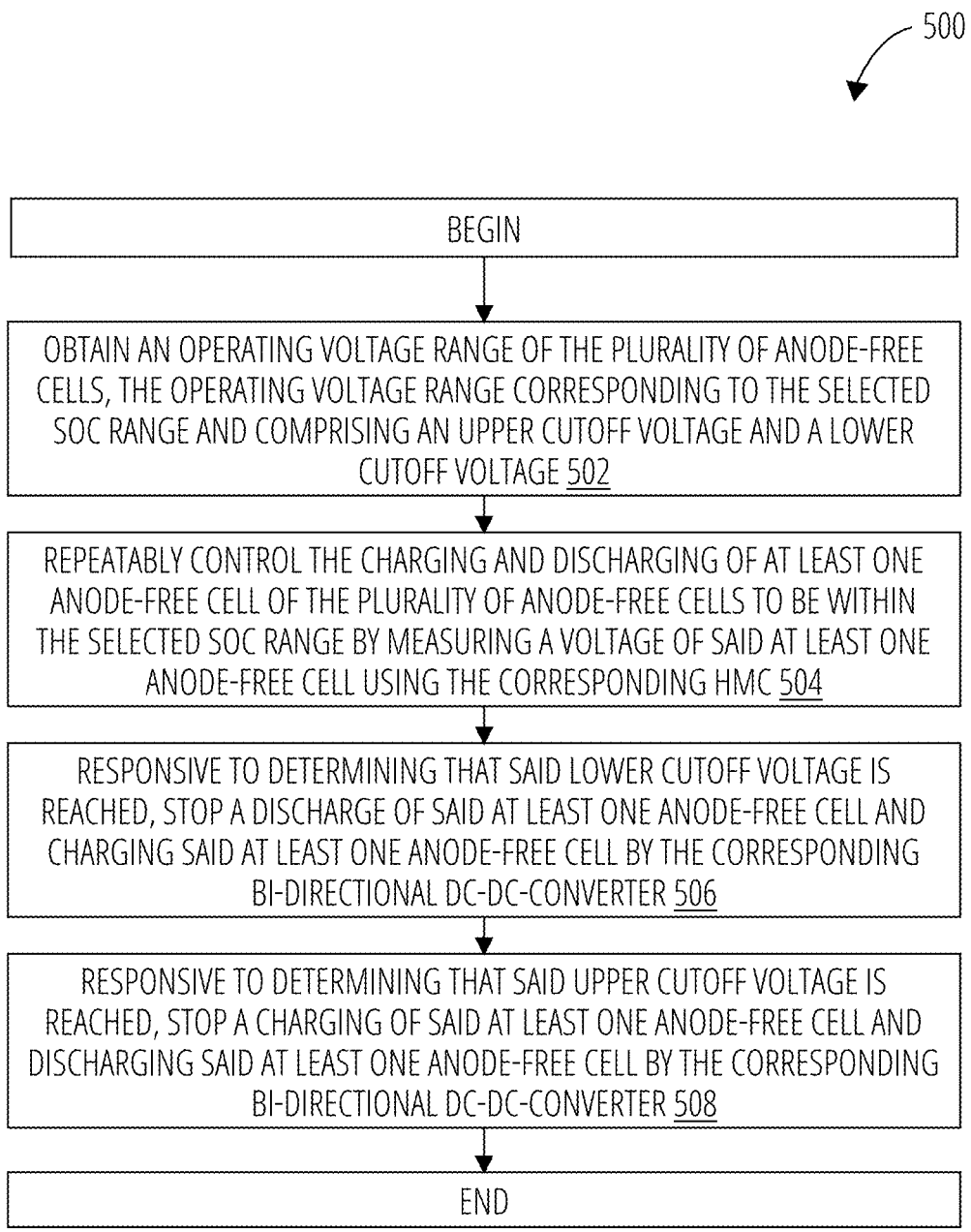
FIG. 5 depicts a process in accordance with one or more embodiments.

FIG. 5 shows another process 500 in accordance with one or more embodiments. The process provides a repeatable operation of a plurality of anode-free cells in a power-supply system wherein, in step 502, an operating voltage range of the plurality of anode-free cells 100 is obtained. The operating voltage range corresponds to a selected SOC range and comprises the upper cutoff voltage 606 and the lower cutoff voltage 608. In step 504, process 500 controls, in a repeatable manner, the charging and discharging of at least one anode-free cell of the plurality of anode-free cells to be within the selected SOC range by measuring a voltage of the at least one anode-free cell using the corresponding HMC. In step 506, process 500, responsive to determining that the lower cutoff voltage is reached, stops a discharge of the at least one anode-free cell 100. The anode-free cell 100 may be subsequently charged to regain the lost energy. In step 508, process 500, responsive to determining that the upper cutoff voltage is reached, stops a charging of the at least one anode-free cell 100. The anode-free cell 100 may be subsequently discharged. The charging and discharging may be repeated while observing that the upper and lower cutoff voltages are not exceeded.

Figure 12:
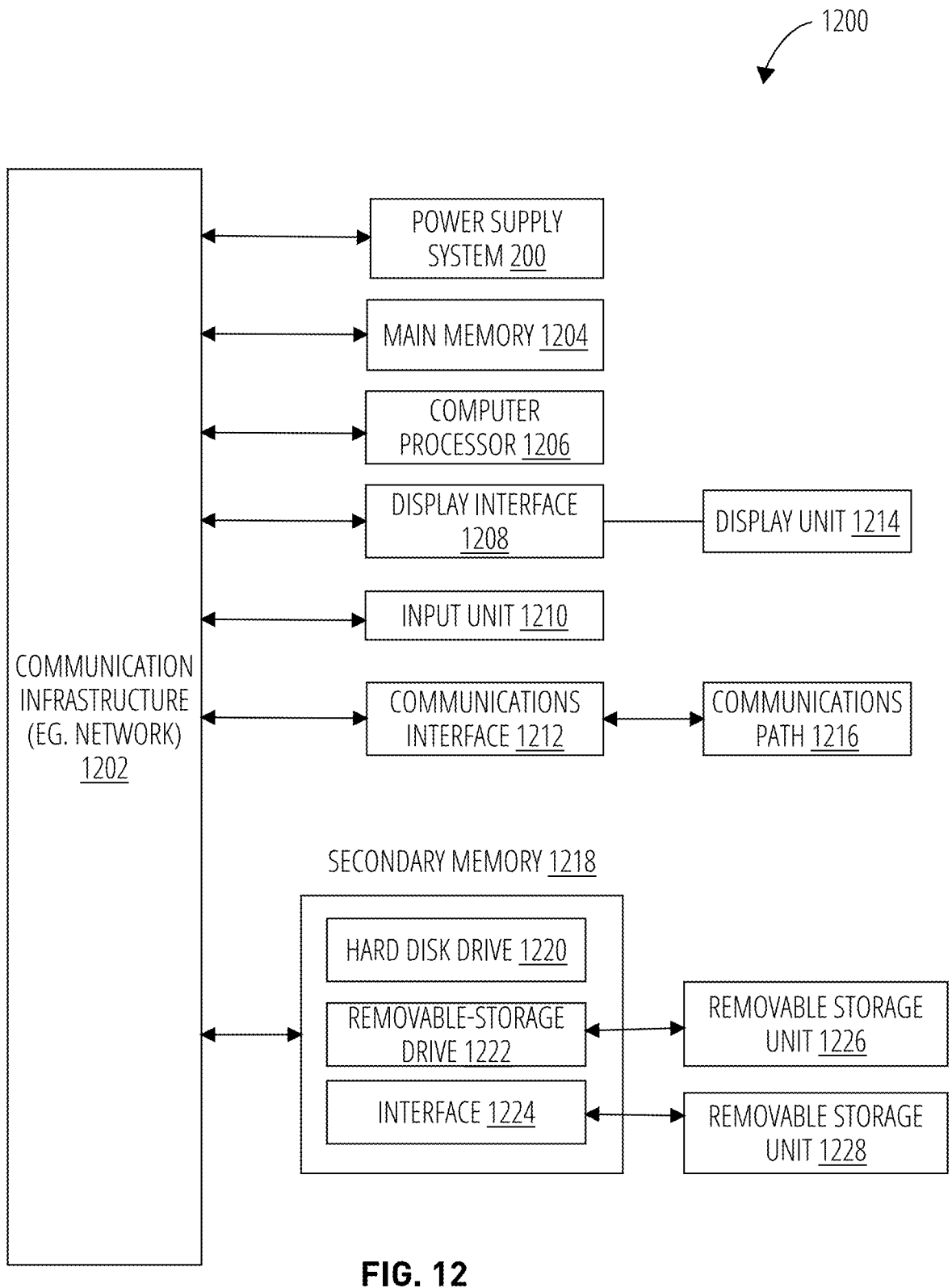
FIG. 12 depicts a block diagram of a computer system in accordance with one or more embodiments.

Having described the power supply system 200, anode-free cell 100 and methods of use thereof, reference will now be made to FIG. 12, which shows a block diagram of a computer system 200 that may be employed in accordance with at least some of the illustrative embodiments herein. Although various embodiments may be described herein in terms of this exemplary computer system 1200, after reading this description, it may become apparent to a person skilled in the relevant art(s) how to implement the disclosure using other computer systems and/or architectures.

In one example embodiment herein, the computer system 1200 forms a part or is independent of computer system 224 of FIG. 2. Moreover, at least some components of the power supply system 200 may form or be included in the computer system 1200 of FIG. 12. The computer system 1200 includes at least one computer processor 1206. Processor 206 and processor 218 of the power supply system 200 may be or form part of computer processor 1206 or may be independent of computer processor 1206. The computer processor 1206 may include, for example, a central processing unit (CPU), a multiple processing unit, an application-specific integrated circuit ("ASIC"), a field programmable gate array ("FPGA"), or the like. The computer processor 1206 may be connected to a communication infrastructure (e.g., Network) 1202 (e.g., a communications bus, a network). In an illustrative embodiment herein, the computer processor 1206 includes a CPU that that controls a process of operating the power supply system 200 or hybrid module controller 216 including controlling a state of bi-directional DC-DC converters between high energy density hybrid modules 212 and the traction battery 202 or drive unit 210.

The display interface 1208 (or other output interface) may forward text, video graphics, and other data about the power supply system 200 from the communication infrastructure (e.g., Network) 1202 (or from a frame buffer (not shown)) for display on display unit 1214 which may be a display of the electric vehicle. For example, the display interface 1208 may include a video card with a graphics processing unit or may provide an operator with an interface for controlling the power supply system 200.

The computer system 1200 may also include an input unit 1210 that may be used, along with the display unit 1214 by an operator of the computer system 1200 to send information such as operating voltage ranges to the computer processor 1206. The input unit 1210 may include a keyboard and/or touchscreen monitor. In one example, the display unit 1214, the input unit 1210, and the computer processor 1206 may collectively form a user interface.

One or more computer-implemented steps of operating the power supply system 200 may be stored on a non-transitory storage device in the form of computer-readable program instructions. To execute a procedure, the computer processor 1206 loads the appropriate instructions, as stored on storage device, into memory and then executes the loaded instructions.

The computer system 1200 may further comprise a main memory 1204, which may be a random-access memory ("RAM"), and also may include a secondary memory 1218. The secondary memory 1218 may include, for example, a hard disk drive 1220 and/or a removable-storage drive 1222 (e.g., a floppy disk drive, a magnetic tape drive, an optical disk drive, a flash memory drive, and the like). The removable-storage drive 1222 reads from and/or writes to a removable storage unit 1226 in a well-known manner. The removable storage unit 1226 may be, for example, a floppy disk, a magnetic tape, an optical disk, a flash memory device, and the like, which may be written to and read from by the removable-storage drive 1222. The removable storage unit 1226 may include a non-transitory computer-readable storage medium storing computer-executable software instructions and/or data.

In further illustrative embodiments, the secondary memory 1218 may include other computer-readable media storing computer-executable programs or other instructions to be loaded into the computer system 1200. Such devices may include removable storage unit 1228 and an interface 1224 (e.g., a program cartridge and a cartridge interface); a removable memory chip (e.g., an erasable programmable read-only memory ("EPROM") or a programmable read-only memory ("PROM")) and an associated memory socket; and other removable storage units 1228 and interfaces 1224 that allow software and data to be transferred from the removable storage unit 1228 to other parts of the computer system 1200.

The computer system 1200 may also include a communications interface 1212 that enables software and data to be transferred between the computer system 1200 and external devices. Such an interface may include a modem, a network interface (e.g., an Ethernet card or an IEEE 1102.11 wireless LAN interface), a communications port (e.g., a Universal Serial Bus ("USB") port or a FireWire® port), a Personal Computer Memory Card International Association ("PCM-CIA") interface, Bluetooth®, and the like. Software and data transferred via the communications interface 1212 may be in the form of signals, which may be electronic, electromagnetic, optical or another type of signal that may be capable of being transmitted and/or received by the communications interface 1212. Signals may be provided to the communications interface 1212 via a communications path 1216 (e.g., a channel). The communications path 1216 carries signals and may be implemented using wire or cable, fiber optics, a telephone line, a cellular link, a radiofrequency ("RF") link, or the like. The communications interface 1212 may be used to transfer software or data or other information between the computer system 1200 and a remote server or cloud-based storage (not shown).

One or more computer programs or computer control logic may be stored in the main memory 1204 and/or the secondary memory 1218. The computer programs may also be received via the communications interface 1212. The computer programs include computer-executable instructions which, when executed by the computer processor 1206, cause the computer system 1200 to perform the methods as described hereinafter. Accordingly, the computer programs may control the computer system 1200 and other components of the power supply system 200.

In another embodiment, the software may be stored in a non-transitory computer-readable storage medium and loaded into the main memory 1204 and/or the secondary memory 1218 using the removable-storage drive 1222, hard disk drive 1220, and/or the communications interface 1212. Control logic (software), when executed by the computer processor 1206, causes the computer system 1200, and more generally the power supply system 200, to perform some or all of the methods described herein.

Lastly, in another example embodiment hardware components such as ASICs, FPGAs, and the like, may be used to carry out the functionality described herein. Implementation of such a hardware arrangement to perform the functions described herein will be apparent to persons skilled in the relevant art(s) in view of this description.

Thus, a system, computer implemented method, computer program product are provided in the illustrative embodiments for operating a power supply system and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
providing an operation of a plurality of anode-free or lithium metal cells in a power-supply system by:
connecting the plurality of cells in series in one or more high energy density hybrid modules connected in parallel, each high energy density hybrid module including a corresponding hybrid module controller (HMC), and each cell of the plurality of cells being independently measurable by the HMC;
providing each high energy density hybrid module with a corresponding bi-directional DC-DC-converter; and
controlling, by the corresponding bi-directional DC-DC-converter, a charging and discharging of the plurality of cells to be within a selected state of charge (SOC) range corresponding to a defined cycle life and energy density requirement, wherein the controlling is repeatable; and
obtaining an operating voltage range of the plurality of cells, the operating voltage range corresponding to the selected SOC range and comprising an upper cutoff voltage and a lower cutoff voltage.

2. The method of claim 1, wherein a cathode of a cell of the plurality of cells is selected to produce a corresponding voltage profile of the cell that has voltages that substantially or fully fall below a gassing voltage of an electrolyte of the cell.

3. The method of claim 2, wherein the cathode comprises one or more materials selected from a list consisting of: Lithium Nickel Manganese Cobalt Oxides (NMC)-Li(Ni$_x$M-n$_y$Co$_z$)O$_2$ where 0≤x+y+z≤1, Lithium Manganese Oxide (LMO)-LiMn$_2$O$_4$, Lithium Manganese Iron Phosphate (LMFP)-LiMn$_x$Fe$_y$PO$_4$ where 0<x+y<1, Lithium Iron Phosphate (LFP), and Nickel-Manganese-Cobalt (NCM).

4. The method of claim 1, further comprising:
controlling the charging and discharging of at least one cell of the plurality of cells to be within the selected SOC range by measuring a voltage of said at least one cell using the corresponding HMC;
responsive to determining that said lower cutoff voltage is reached, stopping a discharge of said at least one cell and subsequently charging said at least one cell by the corresponding bi-directional DC-DC-converter, and
responsive to determining that said upper cutoff voltage is reached, stopping a charging of said at least one cell and subsequently discharging said at least one cell by the corresponding bi-directional DC-DC-converter.

5. The method of claim 1, further comprising:
forming a layer of lithium metal having a defined thickness on a current collector for each of the plurality of cells, the defined thickness ranging from 10 µm to 25 µm.

6. The method of claim 5, further comprising:
depleting the layer of lithium metal during the discharge of the plurality of cells such that at the lower cutoff voltage, a remaining thickness of the lithium metal ranges from 2 µm to 7 µm.

7. The method of claim 1, wherein the selected SOC range is altered to maintain a thickness of a layer of lithium and wherein the upper cutoff voltage and/or the lower cutoff voltage are altered based on a state of health of the plurality of cells to maintain said thickness of the layer of lithium.

8. A battery comprising:
a plurality of anode-free or lithium metal cells connected in series in one or more high energy density hybrid modules connected in parallel, each high energy density hybrid module including a corresponding hybrid module controller (HMC), and each cell of the plurality of cells being independently measurable by the HMC; and
a corresponding bi-directional DC-DC-converter for each high energy density hybrid module; and
a control unit configured to obtain an operating voltage range of the plurality of cells, the operating voltage range corresponding to the selected SOC range and comprising an upper cutoff voltage and a lower cutoff voltage;
wherein the corresponding bi-directional DC-DC-converter is configured to control a charging and discharging of the plurality of cells to be within a selected state of charge (SOC) range corresponding to a defined cycle life and energy density requirement, and wherein the control is repeatable.

9. The battery of claim 8, further comprising a balancing device for a cell of the high energy density hybrid module, the balancing device being connected in parallel with the cell and configured to selectively discharge an electric charge stored in the cell.

10. The battery of claim 8, wherein each cell of the plurality of cells has a stacked electrode configuration.

11. The battery of claim 8, wherein each cell of the plurality of cells has a wound electrode configuration.

12. The battery of claim 8, wherein the plurality of cells each include an electrolyte comprising lithium difluoro (oxalato)borate, lithium tetrafluoroborate and a solvent component.

13. The battery of claim 8, wherein the battery has one or more of an energy density ranging from 500-1500 Wh/L, a cycle life ranging from 50-10000 cycles, a uniaxial pressure on the cells ranging from 0-500 psi, charge and discharge rates ranging from 0.01C-1C and 0.01-10D respectively, and operating temperatures ranging from (−40)° C.-(+100)° C.

14. The battery of claim 13, wherein the battery has the energy density of about 1200 Wh/L, the Cycle Life (to 80%) of about 350, the uniaxial pressure on cells of about 30 psi, the charge and discharge rates of about 0.2C, 0.5D respectively and the operating temperature of 10-40° C.

15. A vehicle comprising:
a range-extender battery comprising:
a plurality of anode-free or lithium metal cells connected in series in one or more high energy density hybrid modules connected in parallel, each high energy density hybrid module including a corresponding hybrid module controller (HMC), and each cell of the plurality of cells being independently measurable by the HMC; and
a corresponding bi-directional DC-DC-converter for each high energy density hybrid module;
a processor; and
a memory storing instructions that, when executed by the processor, configure the vehicle to obtain an operating voltage range of the plurality of cells, corresponding to the selected SOC range, the operating voltage range comprising an upper cutoff voltage and a lower cutoff voltage;
wherein the corresponding bi-directional DC-DC-converter is configured to control a charging and discharging of the plurality of cells to be within a selected state of charge (SOC) range corresponding to a defined cycle life and energy density requirement, and
wherein the control is repeatable.

16. The vehicle of claim 15, the instructions, when executed by the processor, further configuring the vehicle to:
control the charging and discharging of at least one cell of the plurality of cells to be within the selected SOC range by measuring a voltage of said at least one cell using the corresponding HMC;
responsive to determining that said lower cutoff voltage is reached, stop a discharge of said at least one cell and subsequently charge said at least one cell by the corresponding bi-directional DC-DC-converter, and
responsive to determining that said upper cutoff voltage is reached, stop a charging of said at least one cell and subsequently discharge said at least one cell by the corresponding bi-directional DC-DC-converter.

17. The vehicle of claim 16, wherein the processor is further configured to control the charging and discharging of each cell of the plurality of cells to be within the selected SOC range during use.

18. The vehicle of claim 15, further comprising a traction battery configured to be connected to and disconnected from a high-voltage DC bus of the vehicle to power one or more loads of the vehicle;
    wherein a current density of the plurality of cells is controlled to be at a constant rate during use of the vehicle independently of a power requirement of the one or more loads of the traction battery.

19. The vehicle of claim 18, wherein the range extender battery is operable by a battery management system to have one or more selected charge/discharge rates that feed the traction battery at said one or more selected charge/discharge rates to optimize cell life.

20. A battery comprising:
    a plurality of anode-free or lithium metal cells connected in series in one or more high energy density hybrid modules connected in parallel, each high energy density hybrid module including a corresponding hybrid module controller (HMC), and each cell of the plurality of cells being independently measurable by the HMC; and
    a corresponding bi-directional DC-DC-converter for each high energy density hybrid module;
    wherein the corresponding bi-directional DC-DC-converter is configured to control a charging and discharging of the plurality of cells to be within a selected state of charge (SOC) range corresponding to a defined cycle life and energy density requirement, and wherein the control is repeatable; and
    wherein the battery has one or more of an energy density ranging from 500-1500 Wh/L, a cycle life ranging from 50-10000 cycles, a uniaxial pressure on the cells ranging from 0-500 psi, charge and discharge rates ranging from 0.01C-1C and 0.01-10D respectively, and operating temperatures ranging from (-40)° C.-(+100)° C.

21. A vehicle comprising:

a range-extender battery comprising:
    a plurality of anode-free or lithium metal cells (cells) connected in series in one or more high energy density hybrid modules connected in parallel, each high energy density hybrid module including a corresponding hybrid module controller (HMC), and each cell of the plurality of cells being independently measurable by the HMC; and
    a corresponding bi-directional DC-DC-converter for each high energy density hybrid module; and
a traction battery configured to be connected to and disconnected from a high-voltage DC bus of the vehicle to power one or more loads of the vehicle;
wherein the corresponding bi-directional DC-DC-converter is configured to control a charging and discharging of the plurality of cells to be within a selected state of charge (SOC) range corresponding to a defined cycle life and energy density requirement;
wherein the control is repeatable; and
wherein a current density of the plurality of cells is controlled to be at a constant rate during use of the vehicle independently of a power requirement of the one or more loads of the traction battery.

* * * * *